United States Patent
Sakai

[11] 3,958,865
[45] May 25, 1976

[54] RETROFOCUS TYPE LENS SYSTEM
[75] Inventor: Yutaka Sakai, Omiya, Japan
[73] Assignee: Fuji Photo Optical Co., Ltd., Omiya, Japan
[22] Filed: Jan. 27, 1975
[21] Appl. No.: 544,420

[30] Foreign Application Priority Data
Feb. 8, 1974  Japan................................ 49-16024

[52] U.S. Cl. ............................................... 350/214
[51] Int. Cl.² .............................................. G02B 11/34
[58] Field of Search ................................... 350/214

[56] References Cited
UNITED STATES PATENTS
3,512,874  5/1970  Wöltche............................ 350/214
3,549,241  12/1970  Moni................................ 350/214 X Primary Examiner—Paul A. Sacher

[57] ABSTRACT

A retrofocus type lens system particularly useful for single lens reflex cameras. The back focal distance is 1.56 times as long as the effective focal length of the lens system and the angle of view is as large as 84°. The aperture ratio is as large as F/2.8 and all aberrations are well corrected. The lens system comprises a positive meniscus lens L1, two negative meniscus lenses L2 and L3 convex to the front, a positive meniscus lens or plano-convex lens L4 convex to the rear, a biconvex lens L5, a cemented negative lens component consisting of a biconcave lens L6 and a positive meniscus lens L7, a positive meniscus lens L8 convex to the rear, and a positive lens L9.

2 Claims, 4 Drawing Figures

RETROFOCUS TYPE LENS SYSTEM

BACKGROUND OF THE INVENTION

1. Field of the Invention

This invention relates to a retrofocus type lens system, and more specifically to a retrofocus type lens system which is particularly suitable for a single lens reflex camera.

2. Background of the Invention

In a single lens reflex camera, it is often desired to use a retrofocus type lens which has a long back focal distance and a wide angle of view and is made compact in size. It is also desired that the lenses adapted to a single lens reflex camera be free from aberration as much as possible.

SUMMARY OF THE INVENTION

The primary object of the present invention is to provide a retrofocus type lens system of small size which has a long back focal distance and a wide angle of view.

Another object of the present invention is to provide a retrofocus type lens system which is well-corrected for all forms of aberration.

Still another object of the present invention is to provide a retrofocus type lens system for a single lens reflex camera which has a large aperture ratio.

More specifically, the retrofocus type lens system in accordance with the present invention has a long back focal distance as long as 1.56 where the focal length of the lens system is 1.0 and has a wide angle of view as large as 84° and a large aperture ratio of F/2.8. Further, all the aberrations are well corrected and the overall size of the lens system is made considerably small.

PREFERRED EMBODIMENT OF THE INVENTION

Figure 1:
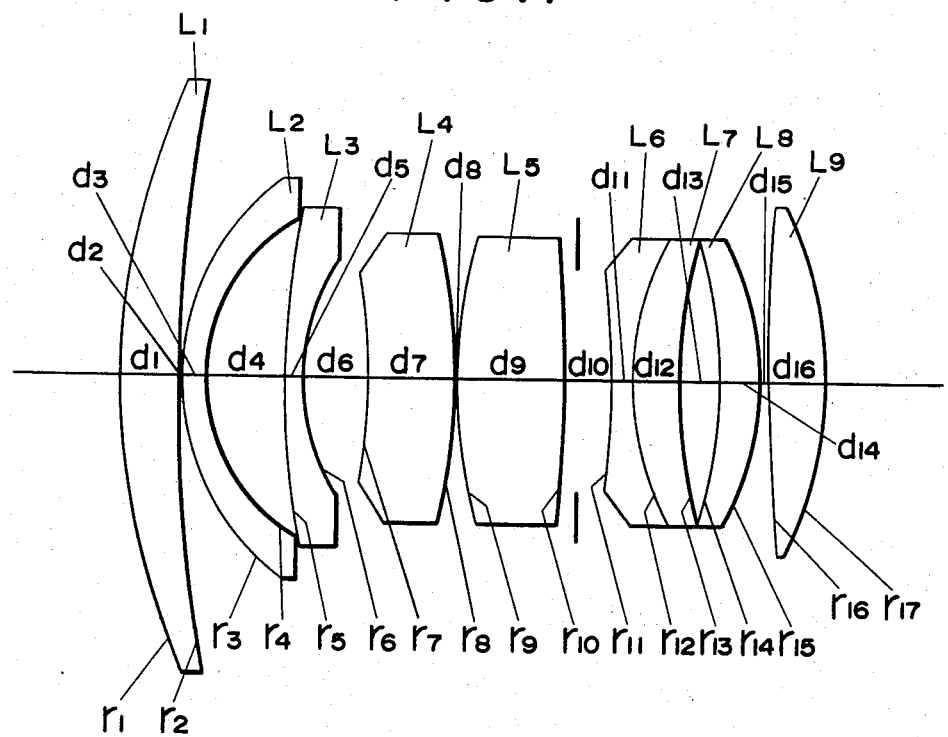
FIG. 1 is a longitudinal illustration of the lens system in accordance with an embodiment of the present invention.

The retrofocus type lens system in accordance with the present invention will be hereinbelow described in detail. It should be made clear that the terms "front" and "rear" are herein used in accordance with the usual convention to relate to the sides of the objective respectively nearer to and further from the longer conjugate.

The lens system in accordance with the present invention comprises a positive meniscus lens L1 (as numbered consecutively from front to rear) convex to the front, two negative meniscus lenses L2 and L3 convex to the front, a positive meniscus or plano-convex lens L4 convex to the rear, a biconvex lens L5, a cemented negative lens component consisting of a biconcave lens L6 and a positive meniscus lens L7, a positive meniscus lens L8 convex to the rear, and a positive lens L9, and satisfies the following conditions where the effective focal length is 1.0:

1) $0.7 < |f_{1,2,3}| < 1.0, f_{1,2,3} < 0$

2) $1.5|f_3| < |f_2| < 2.0|f_3|, f_2 < 0, f_3 < 0$

3) $1.6 < 1/r_3 < 2.0$

4) $-0.7 < 1/r_7 \leq 0$

5) $\nu_4 + \nu_5 < 70.$ wherein $f_{1,2,3}$ represents the effective focal length of a lens system consisting of the first three lenses L1, L2 and L3, $f_2$ and $f_3$ represent the focal lengths of the lenses L2 and L3, $r_3$ and $r_7$ represent the radii of curvature of the third and the seventh surfaces of the lens system, and $\nu_4$ and $\nu_5$ represent the Abbe dispersion numbers of the lenses L4 and L5.

In the retrofocus type lens system as described above, the space between the front negative lens component (L1 to L3) and the rear positive lens component (L4 to L9) is desired to be made as small as possible in order to make the overall size of the lens system compact. However, in order to make the space between the front lens component and the rear lens component small, the refracting power of both lens components must be increased. When the refracting power of the lens components is increased where the angle of view is desired to be as large as 84° and the aperture ratio is desired to be as large as F/2.8, the refracting power of the lenses L2 to L7 and the form thereof must be carefully determined in order to well correct for astigmatism and comatic aberration.

In order to make the diameter of the front lens component small, it is necessary to locate the entrance pupil of the lens system as far from the image as possible by properly designing the shape of the fourth lens L4 as well as to make the overall length of the lens system short.

Further, in order to prevent over-compensation for chromatic aberration under magnification at large angles of view and to reduce the difference in comatic aberration due to the difference in the wavelength (color) of the rays passing through the lens system, the arrangement of the lens elements must be carefully determined.

In consideration of the above requirements, it has been found that the following conditions (1) to (5) should preferably be satisfied.

1) $0.7 < |f_{1,2,3}| < 1.0, f_{1,2,3} < 0$

These first conditions are to be satisfied by the effective focal length $f_{1,2,3}$ to make the whole lens system compact in size. If the focal length $f_{1,2,3}$ becomes equal to or longer than the upper limit 1.0, the overall size of the lens system cannot be made sufficiently small. If the focal length becomes equal to or shorter than the lower limit 0.7, the aberration derived from this part of the lens system becomes too large to well correct the overall aberration.

2) $1.5|f_3| < |f_2| < 2.0|f_3|, f_2 < 0, f_3 < 0$

3) $1.6 < 1/r_3 < 2.0$

These second and third conditions are to be satisfied by the refracting power and the shape of the second and third lenses L2 and L3 to correct astigmatism and comatic aberration for the rays incident to the lens system at large angles. Since, in the lens system in accordance with the present invention, the angle formed between the optical axis and the ray of light incident to the second lens L2 after passing through the first lens L1 is large, it is very important to provide second and third lenses L2 and L3 which have proper refracting power and shape to effectively correct aberrations. If the above conditions are not satisfied, correction for the aberrations becomes difficult.

$$4) \quad -0.7 < 1/r_7 \leq 0$$

These fourth conditions are to be satisfied by the radius of curvature of the front surface of the fourth lens L4 to locate the entrance pupil in the front part of the lens system. If $1/r_7$ becomes larger than the upper limit 0, the entrance pupil cannot be located in the front part of the lens system. If $1/r_7$ becomes equal to or smaller than the lower limit −0.7, it becomes difficult to sufficiently correct the lens system for comatic aberration.

$$5) \quad \nu_4 + \nu_5 < 70$$

These fifth conditions are to be satisfied by the Abbe dispersion numbers of the fourth and fifth lenses L4 and L5 to prevent over-compensation for chromatic aberration under magnification for the rays of light inclined at large angles with respect to the optical axis and to reduce the difference in comatic aberration due to difference in color. If the sum $\nu_4+\nu_5$ becomes equal to or larger than the upper limit 70, the great burden placed on the first lens L1 in compensation for the chromatic aberration becomes great and it becomes difficult to sufficiently correct chromatic aberration.

A preferred example of the retrofocus type lens system forming a specific embodiment of the invention, and having the composite focal length of 1.0, the back focal distance of 1.560, the angle of view of 84° and the aperture ratio of F/2.8, is constructed in conformity with the following Table I, wherein dimensions are in terms of millimeters. The radii of curvature of the refracting surfaces, the axial air separations or thicknesses of lenses, the refractive indices for the sodium d-line and the Abbe dispersion numbers are respectively designated at $r$, $d$, $N$ and $\nu$ which are numbered, respectively, by subscripts in order from front to rear.

The Seidel sums and Petzval sums of the lens system as specified in Table I are shown in Table II, wherein Seidel sums for spherical aberration, comatic aberration, astigmatism and distortion are respectively designated in columns I, II, III and V, and Petzval sums are designated in column P.

Figure 2A:
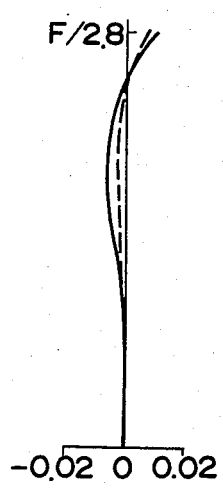
FIG. 2A depicts a graph representing the correction for spherical aberration and the deviation in the sine condition of the lens system shown in FIG. 1.
Figure 2B:
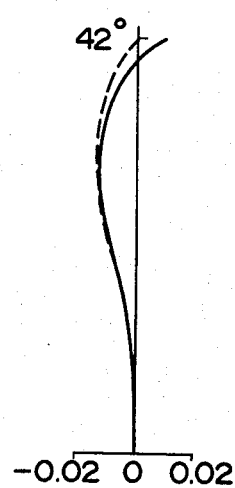
FIG. 2B depicts a graph representing the correction for astigmatism of the lens system shown in FIG. 1.
Figure 2C:
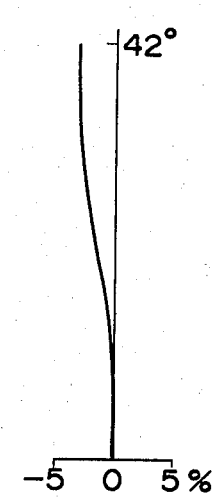
FIG. 2C depicts a graph representing the correction for distortion of the lens system shown in FIG. 1.

The aberrations corrected by the lens system in accordance with the above specified lens system of the present invention are graphically shown in FIGS. 2A to 2C. FIG. 2A shows the correction for spherical aberration and the deviation in the sine condition. FIG. 2B shows the correction for astigmatism wherein the astigmatism on the sagittal image surface is shown by the solid line and that on the meridional image surface is shown by the broken line. FIG. 2C shows the correction for distortion.

When the retrofocus type lens system in accordance with the present invention is put into practical use as an interchangeable lens for a single lens reflex camera with the effective focal length of 24mm, the angle of view of 84° and the aperture ratio of F/2.8, the overall length of the lens becomes about 39mm, the effective diameter of the front lens becomes about 30 mm and the effective diameter of the filter used therewith becomes about 44mm. The size as described above is extraordinarily small for a lens of high performance and wide angle of view as described above.

Table I

| | | | | | | | |
|---|---|---|---|---|---|---|---|
| $r_1$ | 1.53019 | $d_1$ | 0.12 | $N_1$ | 1.60717 | $\nu_1$ | 40.2 |
| $r_2$ | 3.40700 | $d_2$ | 0.01 | | | | |
| $r_3$ | 0.55556 | $d_3$ | 0.05 | $N_2$ | 1.69350 | $\nu_2$ | 53.4 |
| $r_4$ | 0.37037 | $d_4$ | 0.18 | | | | |
| $r_5$ | 1.35156 | $d_5$ | 0.04 | $N_3$ | 1.69350 | $\nu_3$ | 53.4 |
| $r_6$ | 0.49290 | $d_6$ | 0.16 | | | | |
| $r_7$ | −3.33333 | $d_7$ | 0.20 | $N_4$ | 1.64769 | $\nu_4$ | 33.9 |
| $r_8$ | −2.00000 | $d_8$ | 0.01 | | | | |
| $r_9$ | 1.19210 | $d_9$ | 0.24 | $N_5$ | 1.72825 | $\nu_5$ | 28.3 |
| $r_{10}$ | −4.52667 | $d_{10}$ | 0.11 | | | | |
| $r_{11}$ | −1.96067 | $d_{11}$ | 0.05 | $N_6$ | 1.76182 | $\nu_6$ | 26.5 |
| $r_{12}$ | 0.66973 | $d_{12}$ | 0.12 | $N_7$ | 1.77252 | $\nu_7$ | 49.6 |
| $r_{13}$ | 1.60718 | $d_{13}$ | 0.06 | | | | |
| $r_{14}$ | −1.92023 | $d_{14}$ | 0.10 | $N_8$ | 1.62041 | $\nu_8$ | 60.3 |
| $r_{15}$ | −0.65381 | $d_{15}$ | 0.01 | | | | |
| $r_{16}$ | 8.31732 | $d_{16}$ | 0.14 | $N_9$ | 1.51633 | $\nu_9$ | 64.0 |
| $r_{17}$ | −0.80733 | | | | | | |

Table II

| surface | I | II | III | P | V |
|---|---|---|---|---|---|
| 1 | 0.06561 | 0.05737 | 0.05017 | 0.24689 | 0.25978 |
| 2 | 0.00025 | 0.00414 | 0.06752 | −0.11089 | −0.70810 |
| 3 | 0.61544 | 0.06892 | 0.00772 | 0.73711 | 0.08341 |
| 4 | −5.81583 | 0.86982 | −0.13009 | −1.10567 | 0.18482 |
| 5 | 0.38357 | 0.25214 | 0.16574 | 0.30299 | 0.30812 |
| 6 | −12.00247 | −0.16193 | −0.00218 | −0.83080 | −0.01124 |
| 7 | 0.51517 | 0.45115 | 0.39508 | −0.11793 | 0.24271 |
| 8 | −0.05368 | −0.12979 | −0.31384 | 0.19655 | −0.28361 |
| 9 | 5.37374 | 1.44821 | 0.39029 | 0.35348 | 0.20044 |
| 10 | 0.02339 | −0.04610 | 0.09088 | 0.09309 | −0.36264 |
| 11 | −0.17349 | 0.15925 | −0.14618 | −0.22054 | 0.33662 |
| 12 | 0.19485 | 0.04769 | 0.01167 | 0.00512 | 0.00411 |
| 13 | −5.22338 | −2.41931 | −1.12055 | −0.27118 | −0.64461 |
| 14 | 0.08489 | 0.18168 | 0.38885 | −0.19939 | 0.40549 |
| 15 | 4.12895 | −0.51253 | 0.06362 | 0.58560 | −0.08059 |
| 16 | 0.01183 | 0.02880 | 0.07010 | 0.04094 | 0.27026 |
| 17 | 13.39330 | −0.27668 | 0.00572 | 0.42178 | −0.00883 |
| Σ | 1.52213 | 0.02282 | −0.00549 | 0.12714 | 0.19614 |

I claim:

1. A retrofocus type lens system comprising a positive meniscus lens L1 convex to the front as numbered consecutively from front to rear, two negative meniscus lenses L2 and L3 convex to the front, a positive meniscus lens L4 convex to the rear, a biconvex lens L5, a cemented negative lens component L6 and L7, a positive meniscus lens L8 convex to the rear, and a positive lens L9, wherein the following conditions are satisfied;

| | | | | | | | |
|---|---|---|---|---|---|---|---|
| $r_1$ | 1.53019 | $d_1$ | 0.12 | $N_1$ | 1.60717 | $\nu_1$ | 40.2 |
| $r_2$ | 3.40700 | $d_2$ | 0.01 | | | | |
| $r_3$ | 0.55556 | $d_3$ | 0.05 | $N_2$ | 1.69350 | $\nu_2$ | 53.4 |
| $r_4$ | 0.37037 | $d_4$ | 0.18 | | | | |

-continued

| | | | | | | | |
|---|---|---|---|---|---|---|---|
| $r_5$ | 1.35156 | | | | | | |
| | | $d_5$ | 0.04 | $N_3$ | 1.69350 | $\nu_3$ | 53.4 |
| $r_6$ | 0.49290 | | | | | | |
| | | $d_6$ | 0.16 | | | | |
| $r_7$ | −3.33333 | | | | | | |
| | | $d_7$ | 0.20 | $N_4$ | 1.64769 | $\nu_4$ | 33.9 |
| $r_8$ | −2.0000 | | | | | | |
| | | $d_8$ | 0.01 | | | | |
| $r_9$ | 1.19210 | | | | | | |
| | | $d_9$ | 0.24 | $N_5$ | 1.72825 | $\nu_5$ | 28.3 |
| $r_{10}$ | −4.52667 | | | | | | |
| | | $d_{10}$ | 0.11 | | | | |
| $r_{11}$ | −1.96067 | | | | | | |
| | | $d_{11}$ | 0.05 | $N_6$ | 1.76182 | $\nu_6$ | 26.5 |
| $r_{12}$ | 0.66973 | | | | | | |
| | | $d_{12}$ | 0.12 | $N_7$ | 1.77252 | $\nu_7$ | 49.6 |
| $r_{13}$ | 1.60718 | | | | | | |
| | | $d_{13}$ | 0.06 | | | | |
| $r_{14}$ | −1.92023 | | | | | | |
| | | $d_{14}$ | 0.10 | $N_8$ | 1.62041 | $\nu_8$ | 60.3 |
| $r_{15}$ | −0.65381 | | | | | | |
| | | $d_{15}$ | 0.01 | | | | |
| $r_{16}$ | 8.31732 | | | | | | |

-continued

| | | | | | | | |
|---|---|---|---|---|---|---|---|
| | | $d_{16}$ | 0.14 | $N_9$ | 1.51633 | $\nu_9$ | 64.0 |
| $r_{17}$ | −0.80733 | | | | | | | where $r$, $d$, $N$ and $\nu$, respectively, designate the radii of curvature of the refracting surfaces, the axial air separations or thickness of lenses, the refractive indices for the sodium d-line and the Abbe dispersion numbers numbered by subscripts in order from front to rear, whereby the effective focal length of the lens system is 1.0, the back focal distance is 1.56, the angle of view is 84° and the aperture ratio is F/2.8.

2. A retrofocus type lens system as defined in claim 1 wherein said cemented negative lens component consists of a biconcave lens L6 and a positive meniscus lens L7 convex to the front and cemented with the biconcave lens L6.

* * * * *